(12) United States Patent
Foti (10) Patent No.: US 10,404,659 B2
(45) Date of Patent: Sep. 3, 2019

(54) OPTIMIZATION OF RESOURCE URLS IN MACHINE-TO-MACHINE NETWORKS

(71) Applicant: Telefonaktiebolaget L M Ericsson (publ), Stockholm (SE)

(72) Inventor: George Foti, Dollard des Ormeaux (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 702 days.

(21) Appl. No.: 14/896,436

(22) PCT Filed: Jun. 5, 2014

(86) PCT No.: PCT/IB2014/061994
§ 371 (c)(1),
(2) Date: Dec. 7, 2015

(87) PCT Pub. No.: WO2014/195905
PCT Pub. Date: Dec. 11, 2014

(65) Prior Publication Data
US 2016/0127312 A1     May 5, 2016

Related U.S. Application Data

(60) Provisional application No. 61/832,615, filed on Jun. 7, 2013, provisional application No. 61/832,596, filed on Jun. 7, 2013.

(51) Int. Cl.
*G06F 15/16* (2006.01)
*H04L 29/12* (2006.01)
(Continued)

(52) U.S. Cl.
CPC ......... *H04L 61/6004* (2013.01); *H04L 67/12* (2013.01); *H04L 67/16* (2013.01); *H04W 4/70* (2018.02)

(58) Field of Classification Search
CPC ............... G06F 15/00; G06F 15/17337; H04L 61/6004; H04L 67/12; H04L 67/16; H04W 4/70
(Continued)

(56) References Cited

U.S. PATENT DOCUMENTS

2012/0016942 A1   1/2012  Cherian et al.
2012/0278872 A1*  11/2012 Woelfel ............... H04L 61/2596
                                                     726/7
(Continued)

FOREIGN PATENT DOCUMENTS

WO    2011112683 A1    9/2011
WO    2012118711 A2    9/2012
(Continued)

OTHER PUBLICATIONS

K. Czajkowski, S. Fitzgerald, I. Foster and C. Kesselman, "Grid information services for distributed resource sharing," Proceedings 10th IEEE International Symposium on High Performance Distributed Computing, San Francisco, CA, USA, pp. 181-194, 2001. Year: 2001).*
T. Zourntos and N. J. Mathai, "A BEAM-Inspired Lyapunov-Based Strategy for Obstacle Avoidance and Target-Seeking," 2007 American Control Conference, New York, NY, 2007, pp. 5302-5309, 2007. (Year: 2007).*
(Continued)

*Primary Examiner* — Jeffrey R Swearingen
*Assistant Examiner* — Messeret F Gebre
(74) *Attorney, Agent, or Firm* — Sage Patent Group (57) ABSTRACT

A mechanism for forming and using shortened Uniform Resource Locators or URLs for resources available within a Machine-to-Machine, M2M, network enables the use of a Domain Name Server based routing of M2M messages between entities within the M2M network domain without requiring the memory-intensive storage that would be required for indicating the full network topology associated with the actual resource locations.

10 Claims, 4 Drawing Sheets

(51) Int. Cl.
*H04L 29/08* (2006.01)
*H04W 4/70* (2018.01)
(58) Field of Classification Search
USPC .......................................................... 709/223
See application file for complete search history.

(56) References Cited

U.S. PATENT DOCUMENTS

| | | | | |
|---|---|---|---|---|
| 2013/0056533 A1* | 3/2013 | Zimberoff | ............. | G06Q 10/08 235/375 |
| 2013/0159233 A1* | 6/2013 | Mason | ............. | G06F 17/30864 706/45 |
| 2015/0143472 A1* | 5/2015 | Kim | ..................... | H04W 48/02 726/4 |

FOREIGN PATENT DOCUMENTS

| | | |
|---|---|---|
| WO | 2014037054 A1 | 3/2014 |
| WO | 2014037055 A1 | 3/2014 |

OTHER PUBLICATIONS

Mohamed Ibrahim, "Threshod Based Kernel Level HTTP Filter (TBHF) for DDoS Mitigation", I. J. Computer Network and Information Security, 2012, 12, pp. 31-39, 2012. (Year: 2012).*

Shelby, Z., "Core Link Format", Core, Internet-Draft, Intended Status: Standards Track, Sensinode, Oct. 25, 2010, pp. 1-11.

Unknown, Author, "3GPP TS 23.682 V12.0.0 (Dec. 2013)", 3rd Generation Partnership Project; Technical Specification Group Services and System Aspects; Architecture enhancements to facilitate communications with packet data networks and applications (Release 12), Dec. 2013, pp. 1-33.

Unknown, Author, "oneM2M Functional Architecture", oneM2M-TS-0001 oneM2M Functional Architecture-V-0.2.0, Oct. 2013, pp. 1-125.

Unknown, Author, "oneM2M Functional Architecture", oneM2M-TS-0001-V0.3.2, Jan. 7, 2014, pp. 1-168.

Unknown, Author, "oneM2M Functional Architecture Baseline Draft", oneM2M-TS-0001-V0.4.2, Mar. 4, 2014, pp. 1-298.

* cited by examiner

OPTIMIZATION OF RESOURCE URLS IN MACHINE-TO-MACHINE NETWORKS

TECHNICAL FIELD

This disclosure relates generally to machine-to-machine interactions between nodes served by a machine-to-machine service provider.

BACKGROUND

To promote interoperability between devices and services, machine-to-machine (M2M) communications have been the focus of standard organizations. One such organization, the European Telecommunications Standards Institute (ETSI), has developed a set of M2M standards that allow a hierarchical arrangement of M2M entities (including devices and gateways along with the applications run thereon, network infrastructure, and network applications). A standardized naming framework has been developed, which allows for certain optimizations. However, there are still issues that are being resolved. One such issue involves the usage of an M2M resource URL in M2M operations.

Typically to fetch information, or for that matter in any operation involving an M2M resource, the request originator submits its request to the local service control layer, SCL, entity with which it is registered. If the request can be fulfilled locally at the SCL then the request is fulfilled, and the result directly provided to the M2M resource. If the request cannot be fulfilled locally, the SCL typically acts as a proxy and forwards the request to the network SCL entity, referred to as the N-SCL. The N-SCL then determines the host at which the resource is located, typically by resolving a URL associated with the resource, referred to in current standards as a targetID. The URL is typically found in the request, and is resolved to a point of contact such as an IP address. This information is stored in the N-SCL M2M resource structure under the registered SCL for the target SCL where the requested resource is hosted.

In current standards, a request sent to an N-SCL must include the fully qualified domain name, FQDN, of the M2M resource URL. Those skilled in the art will appreciate that such URLs can become very large and cumbersome. As the length of the URL increases, problems arise at least for some families or types of devices. The FQDN for a given resource is typically required so that when the request is routed from the N-SCL to the target SCL associated with the resource, the target SCL is able to identify the resource in question. It should be understood that a single M2M device or gateway may support a plurality of different M2M applications, each of which has a different identity, but the device itself will typically have a single IP address and an SCL to support the applications running thereon. Thus, more than one M2M entity may be associated with the same IP address or other host address.

The expansion of the FQDN creates unnecessary overhead and can result in handling problems. Such problems have been recognized in cases involving interaction between entities subscribing to different M2M Service Providers or SPs. However, it is recognized herein that approaches to resolving such problems are not necessarily applicable to or efficient in cases where the nodes all belong to the same SP. Therefore, it would be desirable to provide a system and method that obviate or mitigate the above described problems.

SUMMARY

It is an object of the present invention to obviate or mitigate at least one disadvantage of the prior art. Accordingly, in an example embodiment, a network node operates as a Network Services Capability Layer, N-SCL, in a Machine-to-Machine, M2M, network. The node implements a method that includes receiving a service discovery request from a requesting M2M entity, determining that a published resource matches the service discovery request, and forming a shortened Uniform Resource Locator, URL, for the published resource. The shortened URL includes a host identifier, ID, for a hosting M2M entity associated with the published resource and a resource ID for the published resource, but omits path and domain-name information that would be included in a full URL for the published resource. The example method correspondingly includes returning the shortened URL, rather than the full URL, to the requesting M2M entity in a service discovery response.

Such operations may be applied generally, but are particularly advantageous when the requesting M2M entity is a constrained device that may not be able to accommodate the full URL of the published resource. Notably, the shortened URL may be returned to the N-SCL, such as in a resource request sent from a requesting M2M entity. According to the teachings herein, the method therefore may further include receiving a resource request at the N-SCL and identifying the published resource targeted by the resource request, based on the shortened URL included in the request.

In another example, embodiment, a network node is configured for operation as a N-SCL in a M2M network. The node includes a memory for storing data representing resources published at the N-SCL, a network interface configured to receive a service discovery request from a requesting M2M entity, and a processor associated with the memory and the network interface. The processor is configured to determine that a published resource matches the service discovery request and to form a shortened URL for the published resource. As previously noted, the shortened URL includes a host ID, for a hosting M2M entity associated with the published resource and a resource ID for the published resource, but omits path and domain-name information that would be included in a full URL for the published resource. Correspondingly, the processor is configured to return the shortened URL, rather than the full URL, to the requesting M2M entity in a service discovery response.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

In one aspect of the teachings herein, a system and method are directed to accessing M2M resources between M2M entities served by the same M2M service provider or SP. The following discussion identifies example mitigations for the prior art problems identified in the Background section of this document and, notably, these mitigations, in at least some embodiments, reduce the memory overhead associated with storing information representing resources that are available for discovery and use within an M2M network domain. In particular, the "reduction" arises from the use of "shortened" Uniform Resource Locators, URLs, for identifying such resources.

According to the teachings herein, a shortened URL omits certain domain-name and path information that would be included in the corresponding full URL of a given resource—e.g., a given data file stored at a given host within the M2M network, according to a fully qualified domain name and full pathname information. However, the shortened URL as taught herein includes everything needed for an appropriately configured Network Services Capability Layer, N-SCL, to uniquely identify the subject resource. In particular, the shortened URL includes a resource identifier, ID, and a host ID. The resource ID is, for example, a filename, label or other identifier corresponding to the actual resource, while the host ID is an Internet Protocol, IP, address, or other identifier of the M2M entity that owns, controls or otherwise manages the resource.

This solution facilitates, for example, the use of ETSI compliant operations for resource constrained devices. As previously noted, ETSI has already defined an inter-M2M resource discovery mechanism that makes use of the Domain Name Servers, DNS. The DNS mechanisms are used when an M2M entity served by a first M2M SP needs to connect to an M2M entity served by a second M2M SP. The use of DNS for the inter-M2M SP communication resulted in the introduction of naming conventions.

M2M networks include a N-SCL, along with any number of Gateway SCLs, G-SCLs, and any number of Device SCLs, D-SCLs. Each such SCL has its own identifier within the M2M network, referred to as its SCL-ID. The current ETSI standards define a structure for the public domains of the various SCLs as:

N-SCL public domain name: <N-SCL Identifier>. <M2M Service provider domain name>

GSCL public domain name: <GSCL Identifier>. <N-SCL public domain name>

DSCL public domain name: <DSCL Identifier>. <N-SCL public domain name>

Those skilled in the art will appreciate that each G-SCL and D-SCL is a sub-domain of the corresponding N-SCL, which in turn is a subdomain of the M2M SP. The N-SCL can therefore easily construct the fully qualified domain name, FQDN, for any SCL, provided it has the correct SCL-ID.

Those skilled in the art will also appreciate that within an M2M SP, there is typically known structure for the path to a stored resource. This structure is based on knowledge of the M2M resource tree, which provides a standardized mechanism for storing different types of resources in different locations. In ETSI implementations, the standardized M2M resource tree serves this purpose. Taken in conjunction with the above discussion of a FQDN, any M2M entity in the M2M SP domain can construct an entire FQDN, including a path to the resource on the basis of the SCL identifier (SCL-ID) and a resource ID. Here, it will be understood that the resource ID itself is not the full path to where the resource is stored and instead is typically the last element in the path, e.g., the actual filename or label of the resource in question.

In some of the embodiments disclosed herein, an N-SCL advantageously use "resource type" information as a mechanism for resolving the full URL of a given resource that is identified to the N-SCL according to a shortened URL. In this regard, it is notable that the current ETSI standards do not use or define or use such "resource type" information. In particular, consider the case where a given resource is stored at a hosting M2M entity—the "host". In this example, the resource ID is unique for a given type of resource—i.e., no two resources of the identical type will have the same resource ID—but the resource ID is not necessarily unique across resource types. In such circumstances, a shortened URL as taught herein will include: (1) the host ID, (2) the resource ID, and (3) the resource type. These three pieces of information allow the N-SCL to resolve the full URL of the resource in question by: (1) identifying the hosting M2M entity from the host ID, (2) identifying the intermediate path information for the resource based on the path information known by virtue of knowing where in a predefined storage structure different types of resources are stored, and (3) using the resource ID to complete or terminate the path information.

Thus, by introducing a resource type as proposed herein, the FQDN system employed for inter-M2M SP communications is enhanced and extended for use in communications between entities within an M2M SP domain. As a particularly advantageous but non-limiting example, the resource type information allows shortened URLs to be resolvable into full URLs even in cases where the uniqueness of resource identifiers at the respective hosting M2M entities cannot be guaranteed. Of course, it is also contemplated herein that, at least in cases where resource IDs are unique with respect to the involved hosts, the shortened URLs are fully resolvable without resource type information and thus may be further compacted to include only host ID and resource ID.

To more fully explain the manner in which the extended FQDN system can be used, comparisons between the solutions of the existing art and those of the extended FQDN system will now be presented.

When the ETSI defined structure was initially provided, the <sclBase> part, which serves as the root of the M2M resource tree in ETSI, was left up to the M2M SP to define. This aspect would have to be known, by offline means, to any M2M entity that wanted to access the M2M resources within any given host. That is, without knowledge of the SP-defined storage structure, the requesting M2M entity would not be able to provide, so that they can fully define the path where the resource is stored on the M2M target host. As a result, the internal structure could be different for every node. When DNS for inter-M2M SP communication was adopted by ETSI, the <sclBase> could be used as the identical starting root in all M2M nodes storing M2M resources. That is, every entity according to this scheme has the same starting point for resource storage, as opposed to one which had to be known by offline means for every host of interest. This scheme was possible through the naming convention introduced in the DNS approach used for inter-M2M SP communication. As a result, there is now a constant path prefix that can be used when resolving the full path of any resource that is stored in a host that conforms to the ETSI standardized storage structure.

Thus, to target a resource, say a group, in a host SCL identified as SCL-1, the full path name for the stored resource of interest would have the following form:

/sclBase/scls/slc-1/groups/group-1.

Based on the understanding that the prefix for a resource of type group in an SCL collection is sclBase/scls/scl-1/groups/ and the fact that the FQDN of the SCL in question can be constructed using the DNS naming conventions, it is advantageously recognized herein that a N-SCL can construct the full URL of a resource just by knowing the ID of the host where the resource is located or controlled, the resource ID of the subject resource, here the group identifier, group-1, and the resource type, which here is an SCL group type.

Now consider a scenario where the desired resource is a group within the group collection under <sclBase> in a given hosting M2M entity. In this scenario, the full path information for the resource as stored at the host can be structured as /sclBase/groups/group-1.

From the above path, one sees that the resource type at issue is an sclBase group type. Thus, it is recognized herein that, at least in cases where the storage path for given resources is controlled according to a defined structure that segregates resources by resource type, an N-SCL can derive the full path information for any given resource using its knowledge of the storage structure—i.e., the default type-based storage paths—and the resource ID of the subject resource. Thus, in such scenarios the N-SCL can construct the full URL for any given resource, including determining a FQDN for the hosting M2M entity, simply by exploiting the DNS-based domain naming conventions and exploiting its knowledge of the type-based storage structure locations in use at the hosting M2M entity.

One important consideration is how a request issuer is able to know the host ID, e.g., the SCL-ID, associated with a targeted resource. Here, the request issuer shall be understood as an M2M entity that originates some type of request applicable to a resource. The requesting M2M entity may obtain the host ID during a service discovery process or by offline means. However, according to the teachings herein, the requesting M2M entity is provided with the host ID by way of identifying the resource to the requesting M2M entity in a shortened URL. As compared to providing the full URL, the shortened URL represents a more efficient process because less information has to be signaled and stored. Perhaps more important, the shortened URL is usable by any requesting M2M entity, including constrained devices that may not be capable of handling full URLs.

With the above in mind, one aspect of the teachings disclosed herein is a new mechanism for service discovery. To better appreciate that mechanism, first consider the pre-existing service discovery mechanisms. In an ETSI standard compliant system, service or resource discovery within a single M2M SP domain typically involves gateways or devices announcing to the N-SCL, the resources they would like to be publicly discoverable by other M2M entities within the domain. This process can be understood as a form of publication, where the resources in question are "published" at the N-SCL, so that they can be identified, as appropriate, in response to service discovery requests from given requesting M2M entities. Note that when a resource is published at the N-SCL, the publication may involve storing the actual resource at the N-SCL, or may involve storing information about the resource at the N-SCL, while the actual resource is stored at the publishing host. In either case, the resource is a "published resource" from the perspective of the N-SCL and other M2M entities in the domain.

Later, a device or other M2M entity sends a service discovery request directly to the N-SCL, or to an associated G-SCL or D-SCL, when then acts as a proxy and forwards the request towards the N-SCL. Upon receipt of the service discover request, the N-SCL searches through its published resources, looking for published resources that match the service discover request. Here, it should be noted that SCLs registered with the N-SCL provide the N-SCL with search criteria for the published resources associated with them, and the N-SCL uses such search criteria to determine which published resources are a "match" for a given service discovery request.

When a published resource matches a service request discovery, the N-SCL provides the requesting entity with URL information for the matching published resource in a service discovery response. In turn, this return allows the same requesting entity to later make a resource request that targets the published resource, using the URL provided to it by the N-SCL. As advantageously taught herein, the URL information returned by the N-SCL in the service discovery response is shorted URLs for the published resource or resources that match the service discovery request.

In contrast, existing approaches where an N-SCL returns full URL information is more memory intensive and not compatible with constrained devices that cannot necessarily accommodate full URLs. It is recognized herein that such memory issues will become particularly acute as the number of M2M nodes and searchable services grows. In particular, when any given node can support multiple discoverable services, the scaling issue becomes even more problematic.

The shortened URL as taught herein in one or more embodiments alleviates those scaling problems by exploiting the fact that the published resource is associated with a known host—e.g., a known SCL-ID for the associated registered SCL. Therefore, the N-SCL in at least some embodiments can resolve the full path information for a given resource from the associated resource ID and host ID. Moreover, even if the resource ID in question is not unique at the associated host across all resource types, the N-SCL can exploit its knowledge of the type-based path structure used for resource storage at or by the host, and its knowledge of the resource type corresponding to the resource ID, to resolve the full path information for the targeted resource. Therefore, these teachings in combination with use of the extended FQDN system described earlier herein result in a simplified request structure and a reduction in the memory and processing requirements in the N-SCL.

Figure 1:
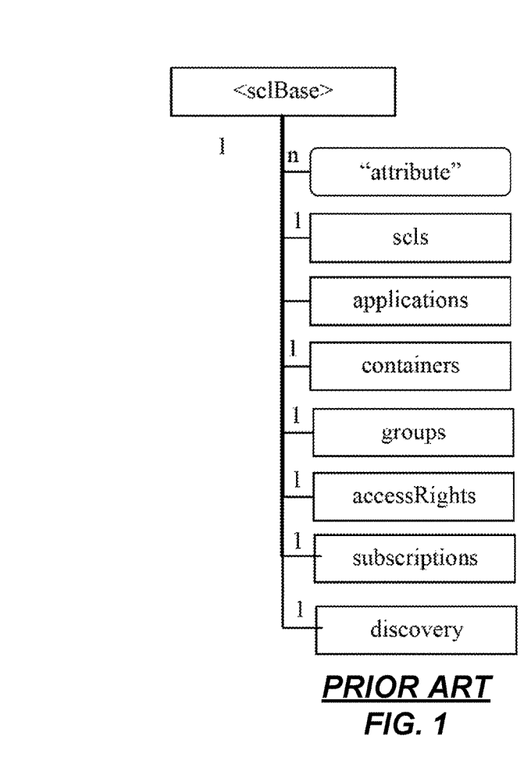
FIG. 1 illustrates a known structure for <sclBase>-resources.
Figure 2:
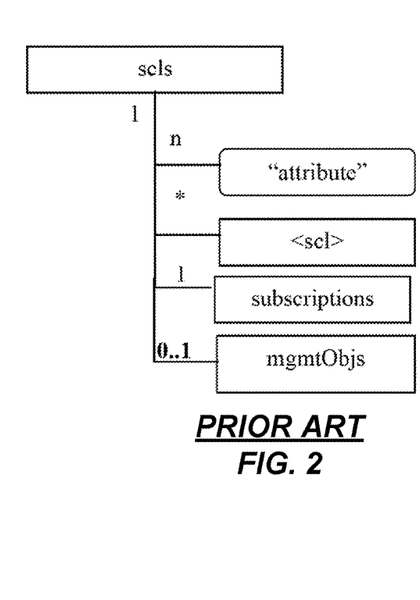
FIG. 2 illustrates a known structure for <scls>-resources such as those under an <sclBase> as shown in FIG. 1.

In an example determination of the proper path prefix as determined the N-SCL for a given published resource that is at issue in a given request, consider the hierarchical structure shown in FIG. 1 for <sclBase> resources. The illustrated slcs resource may have further structure, such as that illustrated in FIG. 2. As shown in FIG. 2, the scls resource can be a collection resource that represents a collection of 0 or more <scl> resources. An <scl> resource may represent a remote SCL that is registered to the containing <sclBase>. This means that each remote SCL that is registered with the <sclBase> is represented by an <scl> resource in that <sclBase> tree for the registered, remote SCL.

Figure 3:
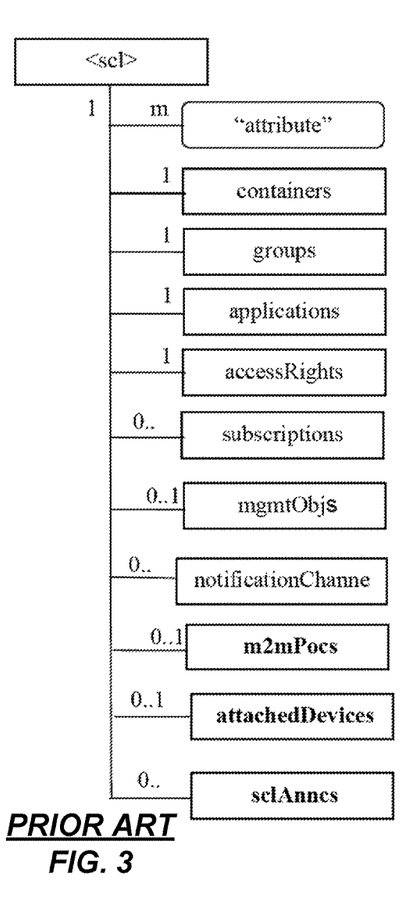
FIG. 3 illustrates a known structure for an <scl> resource.

Additionally, each resource registered to that SCL can be represented as a sub-set <scl> resource in the registering SCL's<sclBase>. For example, when SCL1 registers with SCL2, there can be two <scl> resources created, one in SCL1, <sclBase1>/scls/scl2> and one in SCL2: <sclBase2>/scls/scl1>. Correspondingly, FIG. 3 illustrates an exemplary hierarchical organization for an scl under the slcs in FIG. 2.

In the discussion of the creation of new shortened URLs at an N-SCL, the following resource types are provided as examples of the resource types according to which resource storage paths are differentiated. These examples are illustrative and not exhaustive:

Groups in sclbase
Access rights in sclbase
Containers in sclbase
Application in sclbase
Attribute in sclbase
Subscriptions in sclbase
Groups in sclbase
Access rights in scl
Containers in scl
Application in scl
Attribute in scl
Subscriptions in scl
Attached devices in scl Also, as noted, if there are guarantees that resource IDs in the M2M resource structure are unique, then resource type information may be omitted from the shortened URLs. That further omission may provide further advantages for devices with constrained resources.

The discussion thus far has provided examples of how an N-SCL can reconstruct the full URL for a targeted resource from the SCL-ID, the resource identifier and optionally the resource type. Any given G-SCL or D-SCL can also be provided with the ability to do something similar. Such a G-SCL or D-SCL can, with this added functionality, route an incoming request to the relevant internal resource. In this case, the GSCL or D-SCL can determine, based on the SCL-ID, if the targeted resource can be located locally, or if the request must be forwarded to the N-SCL.

In another aspect worth discussing, the two or three pieces of information identified herein as being contained by shortened URL—namely, the host ID, the resource ID and, optionally, the resource type—are not necessarily provided as separate items of information. For example, they may be provided in some combination or string that is similar to conventional URL information. However, they are distinguishable from the formal, full URLs defined by the IETF. Such formulation of the shortened URLs allow any M2M entity as a user of the shortened URL to distinguish the shortened URL from a normal or full URL. This differentiation allows, for example, the N-SCL to tailor the URL information it provides during service discovery in dependence on the type of device or other M2M entity that is acting as the request originator. Normal devices can receive regular, full URLs, while constrained devices can receive shortened URLs. That is, in response to a given service discovery request, the N-SCL may be configured to send full URL information in the case that the requesting M2M entity is not a constrained device, and to send a shortened URL in the case that the requesting M2M entity is a constrained device.

Such processing provides opportunities to form and use shortened URLs as a single parameter in a request from an SCL or application, or when being returned in a response to a service discovery request. In one example embodiment, the shortened URL has the form of host ID//resource ID//resource type. Here, the host ID is, e.g., the SCL-ID of the SCL that published the resource. Those skilled in the art will appreciate that the use of "//" as a separator is merely one example and any other separator or delimiter can be used in its place, so long as the sending and receiving nodes are able to identify the separators. This approach can be used to allow all devices and/or servers in an M2M domain to use a single URL parameter in all requests and responses, where that single URL parameter may comprise full URL information or may comprise shortened URL information, at least when the signaling at hand involves constrained devices.

These changes impose corresponding changes on the existing call flows used in M2M networks, such as the existing call flows defined by the ETSI standard. In particular, the signaled parameters change when shortened URLs are used and, furthermore, there may be additional verifications imposed on incoming requests, to validate the resource type and SCL-ID. Still further, it will be appreciated that an N-SCL configured according to the teachings herein will carry out the additional processing needed to form shortened URLs and, conversely, to derive full URL information from received shortened URLs. In this regard, it is notable that the "resource type" information, when used, will typically have scope within the target node of the request. That is, the resource type information may have its meaning or definition tied to the host node at which the relevant type-based storage paths are defined.

Figure 4:
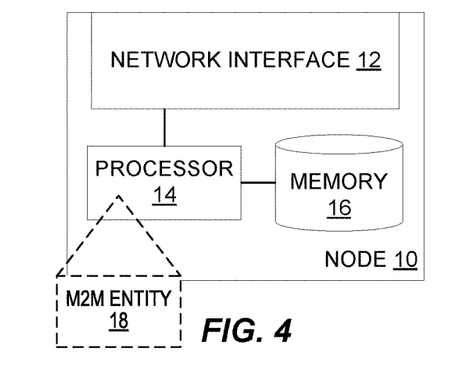
FIG. 4 illustrates a node according to an example embodiment contemplated herein.

FIG. 4 illustrates a node for executing the methods described above, and for making use of rules stored in the memory and exercised by the processor to generate the shortened URLs discussed above, and to route messages used by these shortened URLs.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Embodiments of the invention may be represented as a software product stored in a machine-readable medium, also referred to as a computer-readable medium, a processor-readable medium, or a computer usable medium having a computer readable program code embodied therein. The machine-readable medium may be any suitable tangible medium including a magnetic, optical, or electrical storage medium including a diskette, compact disk read only memory, such as CD-ROM, digital versatile disc read only memory, such as DVD-ROM, a volatile or non-volatile memory device, such as FLASH, EEPROM or RAM, or other such storage mechanism.

The machine-readable medium may contain various sets of instructions, code sequences, configuration information, or other data, which, when executed by a processor of a node, causes the processor to perform steps in the method(s) described herein. Those of ordinary skill in the art will appreciate that other instructions and operations necessary to implement the described invention may also be stored on the machine-readable medium. It will be understood that software running from the machine-readable medium on the processor forms circuitry that is specially adapted to carry out the processing described herein. Notably, the machine-readable medium contemplated herein does not encompass transitory propagating signals.

Figure 5:
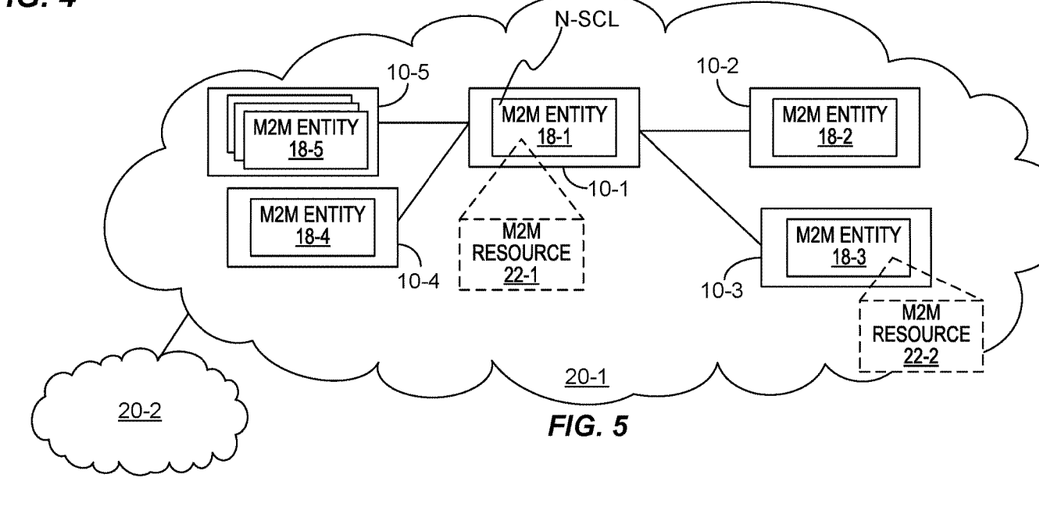
FIG. 5 illustrates one embodiment of a M2M network that includes one or more example nodes.

FIG. 4 illustrates an example network node 10 configured according to the teachings herein. The node 10 comprises a network interface 12, a processor 14 and a memory 16, as an example of a machine-readable medium. The node 10 implements an M2M entity 18, where the term "entity" means an M2M application or SCL that is configured to operate within an M2M network. FIG. 5, for example, illustrates an M2M network 20-1 that is associated with a M2M SP, and which may be communicatively coupled to another M2M network 20-2.

The network 20-1 includes a number of M2M entities, e.g., M2M entities 18-1 through 18-5. When suffixes are not needed for clarity, any given M2M entity is referred to as an "M2M entity 18," and given plural M2M entities are referred to as "M2M entities 18". Each M2M entity 18 is instantiated on a node 10, such as that introduced in FIG. 4, and example nodes 10-1 through 10-5 are shown. Of course, a given node 10 may host more than one M2M entity 18—e.g., a given node 10 may instantiate an SCL as a first M2M entity 18 and may further host one or more M2M applications as additional M2M entities 18, or, similarly, any given node 10 may host multiple applications as distinct M2M entities 18.

With further reference to FIG. 5, one or more of the M2M entities 18 are associated with M2M resources—shown by way of example as resources 22-1 and 22-2. Within the example context of FIG. 5, the node 10-1 is configured for operation in the network 20-1 as a N-SCL, meaning that the M2M entity 18-1 instantiated at the node 10-1 can be understood as a N-SCL within the domain represented by the network 20-1. For convenience, then, the M2M entity 18-1 is simply referred to as the "N-SCL 18-1" and within that framework it will be understood that there may be any number of M2M resources 22 may be published at the N-SCL 18-1. One or more of these published resources 22 may be actually stored at the N-SCL 18-1, such as is suggested by the illustration of the resource 22-1 at the node 10-1. Additionally, or alternatively, one or more the published resources 22 may be stored at their respective host M2M entities 18, with corresponding publication information stored in the N-SCL 18-1.

With the node 10-1 configured for operation as an N-SCL 18-1 in the M2M network 20-1, the memory 16 is configured for storing data representing resources 22 published at the N-SCL 18-1, and the network interface 12 is configured to receive a service discovery request from a requesting M2M entity 18—e.g., a G-SCL, D-SCL, or M2M application. Correspondingly, the processor 14 is associated with the memory 16 and the network interface 12, and is configured to determine that a published resource 22 matches a service discovery request received through the network interface 12, and, in response, to form a shortened Uniform Resource Locator, URL, for the published resource. The shortened URL includes a host identifier, ID, for a hosting M2M entity 18 associated with the published resource 22 and a resource ID for the published resource 22, but omits path and domain-name information that would be included in a full URL for the published resource 22. The processor 14 is further configured to return the shortened URL, rather than the full URL, to the requesting M2M entity 18 in a service discovery response.

In at least some embodiments, the processor 14 is configured to form the shortened URL further by indicating a resource type of the published resource 22 in the shortened URL. Consequently, the requesting M2M entity 22 receives the host ID, the resource ID, and the resource type indication as the shortened URL. In one example of such a configuration, the processor 14 is configured to determine the resource type of the published resource 22, based on determining where data representing the published resource 22 is stored in the memory 16, using a resource structure that has different storage locations for different types of resources. Note that M2M entity 18 that published the resource 22 to the N-SCL 18-1 will have controlled where the publication information was stored, based on the resource type of the resource 22 being published. Further, note that the publishing entity may be N-SCL 18-1 itself, or may be some other M2M entity 18 that publishes the resource 22 to the N-SCL 18-1.

In a working example, the published resource 22 is one among a plurality of published resources 22, each having a corresponding shortened URL. In this context, the processor 14 is configured to receive a resource request via the network interface 12, where the resource request originates from a given requesting M2M entity 18 and includes a given shortened URL. Correspondingly, the processor 14 is configured to determine which one of the plurality of published resources 22 is targeted by the resource request, based on the given shortened URL included in the resource request.

In another example, the hosting M2M entity for a given published resource 22 is not the N-SCL 18-1. Here, the processor 14 is further configured to receive a resource request via the network interface 12, where the resource request originates from a given requesting M2M entity 18 and uses the shortened URL of the published resource 22. The processor 14 is configured to resolve the full URL of the published resource 22, based on the shortened URL, and to forward the resource request to the hosting M2M entity 18, wherein the forwarded resource request includes the full URL of the published resource 22.

Figure 6:
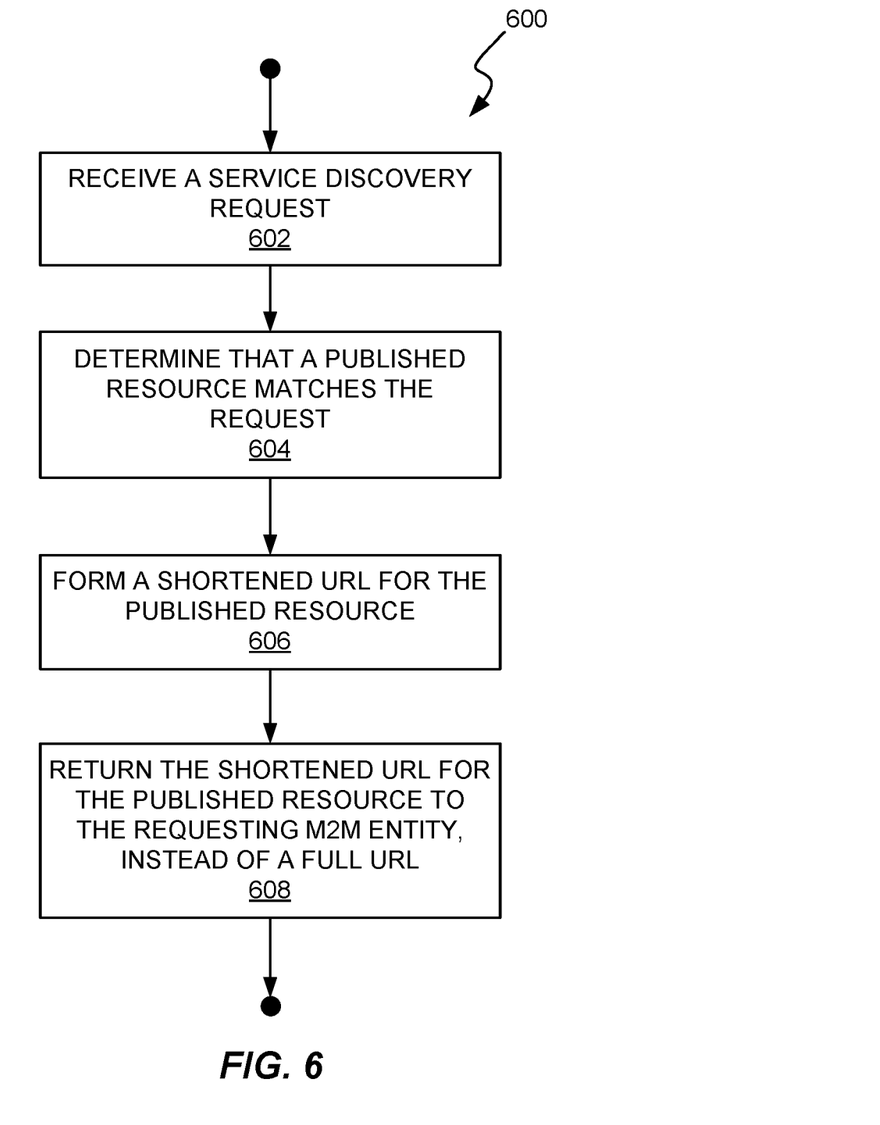
FIG. 6 illustrates one embodiment of a method of processing at an example node configured as an N-SCL.

FIG. 6 illustrates an example method 600 contemplated herein, where the example method is implemented at a network node 10 operating as a N-SCL 18-1 in a M2M network 20-1. The method 600 includes receiving (Block 602) a service discovery request from a requesting M2M entity 18, determining (Block 604) that a published resource 22 matches the service discovery request, and forming (Block 606) a shortened URL for the published resource 22. Here the shortened URL includes a host identifier, ID, for a hosting M2M entity 18 associated with the published resource 22 and a resource ID for the published resource 22, but omits path and domain-name information that would be included in a full URL for the published resource 22. The method 600 further includes returning (Block 608) the shortened URL, rather than the full URL, to the requesting M2M entity 18 in a service discovery response.

The method 600 in some embodiments further includes receiving a resource request from a given requesting M2M entity 18, wherein the resource request includes a given shortened URL, and determining which one among a plurality of published resources 22 is targeted by the resource request, based on the given shortened URL included in the resource request. After the determination, the N-SCL 18-1 either handles the request if it is in control of the published resource 22, or it forwards the request to the appropriate hosting M2M entity 18.

Figure 7:
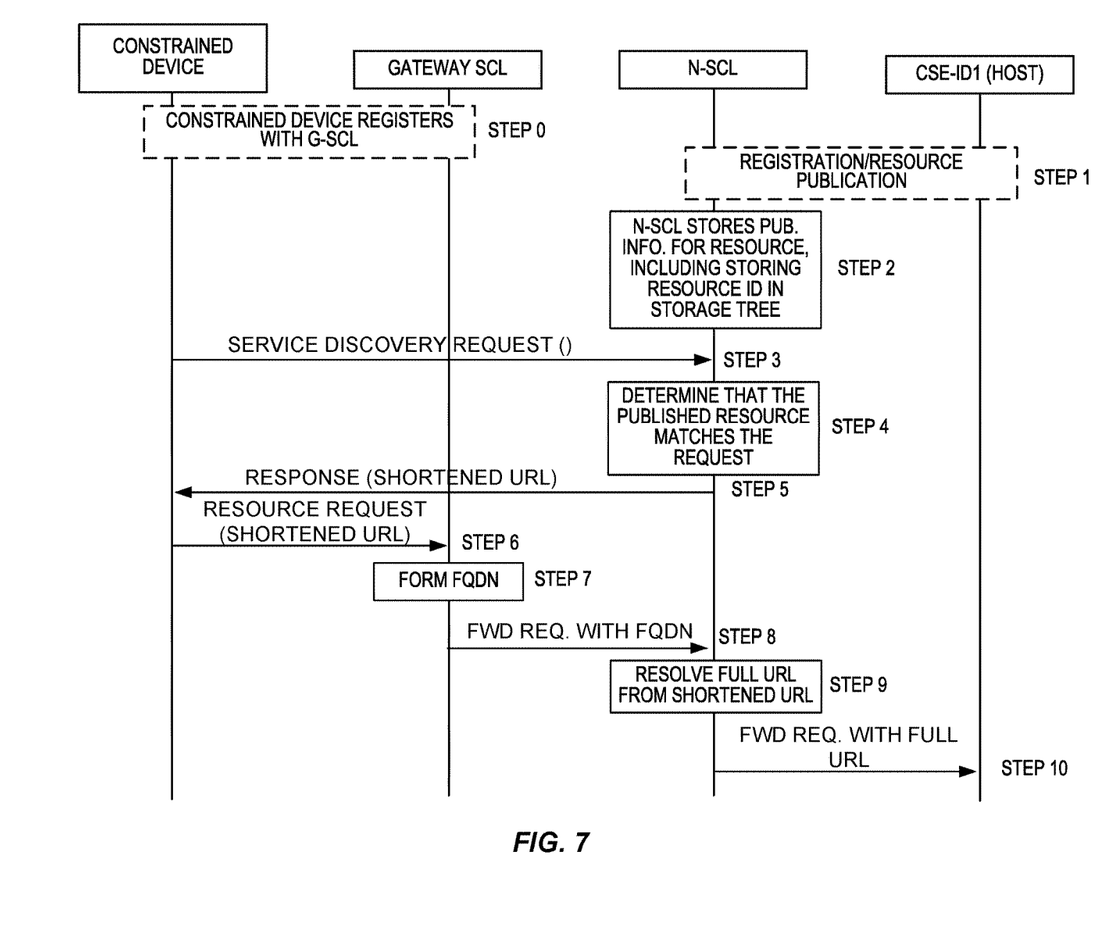
FIG. 7 illustrates one embodiment of a call flow according to example signaling in accordance with the teachings herein.

Steps 1-9 in FIG. 7 illustrates an example call flow corresponding to the method 600. In the context of FIG. 7, a resource 22 is published to the N-SCL by a hosting M2M entity 18 that is labeled in the diagram as CSE-ID1, where "CSE" denotes "Common Support Entity" as used by the OneM2M association to describe certain M2M entities 18. As such, one should understand that the host ID at issue here is the "CSE-ID1" value.

At Step 0, a constrained device registers with a G-SCL, and at Step 1 the CSE registers with the N-SCL and publishes a resource to the N-SCL. At Step 2, the N-SCL stores the publication information, which may be the resource itself or publication data. This storage includes storage of the resource ID of the published resource and the N-SCL may form the shortened URL for the resource at this time, or may do so later, on demand.

At Step 3, the N-SCL receives a service discovery request and at Step 4 it determines that the published resource matches the request. In response, at Step 5, the N-SCL returns the shortened URL for the published resource to the requesting constrained device. At some later time, at Step 6, the constrained device sends a resource request to the G-SCL, e.g., a "read" request, for the published resource. Here, the shortened URL previously provided to the constrained device by the N-SCL is used in the resource request message to identify the published resource.

At Step 7, the G-SCL forms the FQDN for the published resource, and at Step 8 the G-SCL forwards the corresponding request to the N-SCL, which forwarded request includes the FQDN information but does not include full path information—i.e., it has the shorted URL information. At Step 9, the N-SCL determines the full URL from the shortened URL and, because the host that owns or controls the resource in question is external, the N-SCL at Step 10 forwards the request using the fully resolved URL for the targeted resource.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method at a network node operating as a Network Services Capability Layer, N-SCL, in a Machine-to-Machine, M2M, network, said method comprising:
   receiving a service discovery request from a requesting M2M entity;
   determining that a published resource matches the service discovery request;
   forming a shortened Uniform Resource Locator, URL, for the published resource, wherein the shortened URL includes a host identifier, ID, for a hosting M2M entity associated with the published resource and a resource ID for the published resource, but omits path and domain-name information that would be included in a full URL for the published resource; and
   returning the shortened URL, rather than the full URL, to the requesting M2M entity in a service discovery response.

2. The method of claim 1, wherein forming the shortened URL further comprises indicating a resource type of the published resource in the shortened URL, such that the requesting M2M entity receives the host ID, the resource ID, and the resource type indication as said shortened URL.

3. The method of claim 2, further comprising determining the resource type of the published resource based on determining where data representing the published resource is stored within a resource structure at the N-SCL that has different storage locations for different types of resources.

4. The method of claim 1, wherein the published resource is one among a plurality of published resources, each having a corresponding shortened URL, and wherein the method further comprises:
   receiving a resource request from a given requesting M2M entity, wherein the resource request includes a given shortened URL; and
   determining which one of the plurality of published resources is targeted by the resource request, based on the given shortened URL included in the resource request.

5. The method of claim 1, wherein the hosting M2M entity is not the N-SCL, and wherein the method further includes:
   receiving a resource request from a given requesting M2M entity, wherein the resource request uses the shortened URL of the published resource;
   resolving the full URL of the published resource, based on the shortened URL; and
   forwarding the resource request to the hosting M2M entity, wherein the forwarded resource request includes the full URL of the published resource.

6. A network node configured for operation as a Network Services Capability Layer, N-SCL, in a Machine-to-Machine, M2M, network, said network node comprising:
   a memory for storing data representing resources published at the N-SCL;
   a network interface configured to receive a service discovery request from a requesting M2M entity;
   a processor associated with the memory and the network interface, and configured to:
      determine that a published resource matches the service discovery request;
      form a shortened Uniform Resource Locator, URL, for the published resource, wherein the shortened URL includes a host identifier, ID, for a hosting M2M entity associated with the published resource and a resource ID for the published resource, but omits path and domain-name information that would be included in a full URL for the published resource; and
      return the shortened URL, rather than the full URL, to the requesting M2M entity in a service discovery response.

7. The node of claim 6, wherein the processor is configured to form the shortened URL further by indicating a resource type of the published resource in the shortened URL, such that the requesting M2M entity receives the host ID, the resource ID, and the resource type indication as said shortened URL.

8. The node of claim 7, wherein the processor is further configured to determine the resource type of the published resource based on determining where data representing the published resource is stored in the memory using a resource structure that has different storage locations for different types of resources.

9. The node of claim 6, wherein the published resource is one among a plurality of published resources, each having a corresponding shortened URL, and wherein the processor is configured to:
   receive a resource request via the network interface, where the resource request originates from a given requesting M2M entity and includes a given shortened URL; and
   determine which one of the plurality of published resources is targeted by the resource request, based on the given shortened URL included in the resource request.

10. The node of claim 6, wherein the hosting M2M entity is not the N-SCL, and wherein the processor is further configured to:

receive a resource request via the network interface, where the resource request originates from a given requesting M2M entity and uses the shortened URL of the published resource;

resolve the full URL of the published resource, based on the shortened URL; and forward the resource request to the hosting M2M entity, wherein the forwarded resource request includes the full URL of the published resource.

* * * * *